United States Patent Office 3,100,783
Patented Aug. 13, 1963

3,100,783
METHOD OF STABILIZING CRYSTALLINE
COMPOUNDS AGAINST OXIDATION
Pieter Cornelis de Wilde and Menso Pieter Rappoldt,
Weesp, Netherlands, assignors to North American
Philips Company Inc., New York, N.Y., a corporation
of Delaware
No Drawing. Filed June 22, 1959, Ser. No. 821,693
Claims priority, application Netherlands June 26, 1958
5 Claims. (Cl. 260—397.2)

It is known that compounds containing a conjugated system of carbon-carbon double bonds, which is not aromatized, are readily oxidized and that for this reason the stability of these compounds is unsatisfactory when they are exposed to air. This applies in particular to compounds such as vitamin A, carotene, intermediate products in the synthesis of these compounds, for example ionone, -ionylidene acetic acid, vitamin A acid or vitamin A aldehyde, furthermore provitamin $D_2$ or provitamin $D_3$, ergosterol, tachysterol-2 or tachysterol-3, luminsterol-2, or lumisterol-3 and vitamin $D_2$ or vitamin $D_3$.

Oddly enough, most of the trouble taken to protect compounds having a conjugated system of carbon-carbon double bonds against air oxidation, has been directed to the stabilization of these compounds in forms which are suitable for use in practice.

Special techniques have even been developed to adapt, for example, the vitamins A and/or D, when mixed with solid or liquid carrier materials, to storage. A large part of these techniques consist of the use of antioxidants.

Comparatively little attention has, however, been paid to the stabilization of the pure compounds themselves. As a rule, the substances were only dissolved in a solvent and an antioxidant was added to the solution, or the pure compound was stored in a vacuum or in a nitrogen atmosphere in a vessel from which the ambient atmosphere was excluded, for example a sealed ampulla. This latter technique in particular gave satisfactory results, however, it has a limitation in that the contents of the vessel must be used immediately upon its being opened, since upon the admission of air decomposition starts at once. It is remarkable that so small a number of techniques have been developed to protect pure compounds having a conjugated system of carbon-carbon double bonds against oxidation, since a large number of these compounds are used in practice. In particular, the crystalline form of many of these compounds has been much in demand for a considerable time, and furthermore in most cases the industry has proved capable of marketing such compounds in the crystalline form. This applies particularly to crystalline vitamin A and some esters thereof, for example the acetate; and to vitamin $D_2$ or vitamin $D_3$ and some esters thereof, for example vitamin $D_2$ acetate or vitamin $D_3$ butyrate.

Presumably, in most countries the pharmacopoeial requirements have checked the investigation into the stabilization of crystalline compounds. These requirements are such that, for example, the melting point, the ultraviolet spectrum, the specific rotation and the like, of most compounds, for example of vitamin A or vitamin D, must lie within narrow prescribed limits. If one should wish to stabilize these compounds by the addition of, for example, antioxidants in the classical manner, for example _(col. 2)_ by a conventional mixing process, and in a quantity such that a satisfactory stabilizing effect is actually ensured, in most cases this would result in a product the physical properties of which deviate inadmissibly from the requirements to be satisfied to permit of the products being put upon the market.

Surprisingly, it has now been found that a crystalline compound, which has a conjugated system of carbon-carbon double bonds and is stabilized by antioxidants, can be produced with improved stability, while the purity of the compound satisfies exacting requirements.

It has been found that this result can be obtained by bringing the crystalline product into contact with a solution of an antioxidant. Owing to this treatment, the antioxidant presumably adheres to the surface of the individual crystals and/or penetrates into them to a certain depth and effectively coats them with a thin protective layer. It is of importance that the excess antioxidant solution should then be separated from the crystals in order to prevent that the crystal mass contains an excessive proportion of antioxidant owing to drying by evaporation.

Unexpectedly, it has been found that such a stabilization does not require the antioxidant to be distributed uniformly throughout the supply of a crystal to be stabilized. The result of the invention can be obtained in a variety of manners.

First, a solution of the antioxidant (or of a mixture of antioxidants) can be poured over a crystal or an agglomerate of crystals of the compound to be stabilized. If desired, the crystal or an agglomerate of crystals is first treated with a solution of one antioxidant and subsequently with that of another antioxidant. The concentration of the antioxidant solution is not confined within definite limits. Preferably, however, the concentration should not be excessively low, since otherwise too small an amount of antioxidant adheres to the individual crystals. However, in this event the treatment might be repeated several times. For practical reasons, however, it is desirable for the concentration of the antioxidant solution to be not lower than 0.01%. Satisfactory results are obtained with a concentration of from 0.1% to 0.5%.

Alternatively, a greatly higher concentration may be used and one may even go so far as to use a saturated solution. In this event, however, it is desirable for the treated crystals to be finally washed with a dilute solution of the antioxidant in order to prevent a comparatively large quantity of antioxidant to be enclosed in the agglomerate of crystals.

As a further alternative, the crystals may be spread in a thin layer and then sprayed with a solution of the antioxidant. What has been stated hereinbefore with respect to the use of different concentrations or of a number of antioxidants, also applies to this latter case.

Another important embodiment of the invention is that in which one starts from a solution of the compound to be protected, which solution also contains an antioxidant, the compound to be protected being crystallized from this solution. In order not to interfere with the crystallization, in this event the concentration of antioxidant is preferably kept low, for example, between 0.01% and 1%. The solution may also contain a mixture of antioxidants.

After treatment of a crystal or an agglomerate of crystals of the compound to be stabilized with a solution of at least one antioxidant, or after the crystallization of the desired compound from a solution of at least one antioxidant, the crystals must be separated from the excess antioxidant solution. This can be effected in the usual manner by removing the liquid by means of filtration, pressure or suction. If the supply of crystals has been obtained by crystallization from liquids containing at least one antioxidant, it may be preferable for the crystals to be subsequently washed with a solution of the antioxidant or antioxidants. This is especially the case if the separation of the crystals is the last stage in synthesizing the compound. In this manner, impurities from the mother liquor which may have been adsorbed to the crystals, are removed, while any antioxidant which may also have been washed away, is replaced. Finally, the moist supply of crystals must be dried. This can be effected in the usual manner by drying the supply in a furnace at a temperature of from 40° C. to 70° C. for some hours or by centrifuging.

In still another embodiment of the invention, a dilute solution of an antioxidant or of a mixture of antioxidants, which solution contains the compound to be protected, preferably in crystalline form, is sprayed or broken up into a fine mist in a hot gas, for example, air having a temperature between 80° C. and 240° C. In this event, it is desirable for the liquid to contain from 0.01% by weight to 0.5% by weight of antioxidant.

Summing up, one may say in general that the present invention comprises a method of stabilizing oxidizable compounds in the crystalline state, which method is characterized in that the entire surface of each crystal is brought into contact with a solution of at least one antioxidant, after which the crystals so treated are separated from any excess solution and finally the solvent is removed, so that crystals are obtained to the surface of which a slight amount of antioxidant is applied.

The invention can be used with crystalline compounds which are decomposed by oxidation on exposure to air. This applies particularly to crystalline compounds containing a conjugated system of carbon-carbon double bonds in the molecule.

As examples we may mention vitamin $D_2$ or vitamin $D_3$, vitamin A, tachysterol-2 or tachysterol-3 or esters of these compounds and aliphatic carbonic acids, for example vitamin $D_2$ acetate, vitamin $D_2$ propionate, vitamin $D_3$ butyrate, vitamin $D_3$ propionate, vitamin A acetate, vitamin A butyrate, vitamin A palmitate, vitamin A stearate, tachysterol-2 acetate, tachysterol-3 propionate. The invention can also be applied to the stabilization of provitamin $D_2$, provitamin $D_3$, ergosterol and esters thereof, for example provitamin $D_2$ acetate, provitamin $D_3$ butyrate, ergosterol acetate. Suitable antioxidants are, for example, alkylphenols, in particular butylated phenols, for example, 2,6-ditertiary-butyl-4-methoxyphenol, 2,6-ditertiary-butyl-4-methylphenol and mixtures thereof. In addition, vitamin E and/or hydroquinone have proved particularly attractive.

Use may also be made of mixtures of at least two of the above-mentioned antioxidants, while use may also be made of antioxidants in combination with means for inactivating metals, for example citric acid or the Na-salt of ethylene diamine tetra-acetic acid.

Obviously, the choice of the solvents depends upon the choice of the antioxidant. When alkylated phenols, hydroquinone or vitamin E are used, the lower aliphatic alcohols, for example methanol, ethanol, propanol, propanol-2 or butanol can provide highly satisfactory results. Furthermore, acetonitrile has proved a very suitable solvent.

EXAMPLE I

In this example, results are described which have been obtained by crystallizing ergocalcipherol (vitamin $D_2$) from solutions in ethanol some of which also contained antioxidant.

10 gms. of crystalline ergocalcipherol were dissolved in 20 ccs. of 90% ethanol. This solution was divided into three equal parts which hereinafter are designated A, B and C, respectively.

Part A was simply crystallized at —5° C. The separated ergocalcipherol crystals were filtered off on a glass filter and then dried in a vacuum at about 50° C.

In part B, 50 mgms. of 2,6-di-tertiary-butyl-4-methyl phenol were dissolved. Subsequently the solution was caused to crystallize, the separated ergocalcipherol was filtered off and dried as for part A.

In part C, 50 mgms. of 2,6-di-tertiary-butyl-4-methyl phenol were likewise dissolved, subsequently the solution was caused to crystallize, the separated ergocalcipherol was filtered off in the same way as in the above-described processes and subsequently washed with 10 ccs. of 96% ethanol.

Of the products obtained, hereinafter referred to as A, B and C, the stability was determined in the following manner. A thin layer of each product was stored in an open dish in air at 20° C. (in a drying stove). From time to time samples were taken in which the amount of peroxide formed was determined. The peroxide content can be regarded as a measure of the stability; the lower this content, the better the stability of the product.

The peroxide content was determined by adding to an ethereal solution of the sample, in an atmosphere containing no oxygen, an aqueous solution of ferro-sulphate and potassium rhodanide and titrating the ferric rhodanide produced with a solution of titanochloride.

The results are given in Table I which shows for the products A, B and C the amount, in milli-equivalents per kgm. of ergocalcipherol, of peroxide produced after these products had been stored for several days in the above-described manner.

From these results it can be deduced that in the process of washing with ethanol (product C) the antioxidant is removed substantially entirely. From this it can be concluded that, surprisingly, in the crystallization of the ergocalcipheral from the solution containing antioxidant, antioxidant is separated only, or substantially only, onto the surface of the crystals and, according to experiment B, this can give an important stabilization against deterioration by oxidation.

Table I

| Time (in days) | Milli-equivalents of peroxide (per kgm. of ergocalcipherol) | | |
|---|---|---|---|
| | A | B | C |
| 0 | 44 | 16 | 4 |
| 7 | 58 | 6 | 6 |
| 23 | 88 | 1 | |
| 37 | 107 | 6 | 43 |
| 61 | | | 155 |
| 68 | 202 | 9 | |
| 73 | | | 250 |
| 84 | 214 | 9 | |

EXAMPLE II

Batches of 5 gms. of ergocalcipherol were dissolved in and subsequently at —5° C. crystallized from:

(a) 25 ccs. of methanol;
(b) A solution of 25 mgms of 2,6-di-tertiary-butyl-4-methyl phenol and 25 mgms. of tertiary butyl hydroxy anisole in 25 ccs. of methanol;
(c) A solution as under (b) which also contained 20 mgms. of ethylene-diamine tetra-acetate;
(d) A solution of 50 mgms. of hydroquinone in 25 ccs. of methanol.

After crystallization the products were drawn off onto a Buchner filter and dried in a vacuum at about 50° C.

The stability was determined in the manner described in Example I at 35° C.; the results are given in Table II.

Table II

| Time (in days) | Milli-equivalents of peroxide (per kgm. of ergocalcipherol) | | | |
|---|---|---|---|---|
| | a | b | c | d |
| 0 | 6 | 2 | 2 | 2 |
| 3 | 22 | 2 | 2 | 2 |
| 5 | 65 | 2 | 2 | 2 |
| 9 | 200 | 3 | 3 | 2 |
| 12 | >200 | 5 | 5 | 2 |
| 16 | | 6 | 6 | 2 |
| 20 | | 15 | 12 | 3 |
| 27 | | 30 | 55 | 2 |
| 33 | | 140 | 75 | 2 |
| 40 | | | | 3 |
| 46 | | | | 3 |

EXAMPLE III

Batches of 10 gms. of ergocalcipherol were dissolved in and subsequently at 20° C. crystallized from:

(a) 100 ccs. of acetonitrile;
(b) A solution of 600 mgms. of hydroquinone in 100 ccs. of acetonitrile;
(c) A solution of 300 mgms. of hydroquinone in 100 ccs. of acetonitrile;
(d) A solution of 600 mgms. of triethanolamine in 100 ccs. of acetonitrile.

After crystallization the products were separated and dried in the manner described in Example II. The stability was determined in the above-described manner; the results are given in Table III.

Table III

| Time (in days) | Milli-equivalents of peroxide (per kg. of ergocalcipherol) | | | |
|---|---|---|---|---|
| | a | b | c | d |
| 0 | 5 | 5 | 5 | 2 |
| 2 | 62 | 7 | 7 | 4 |
| 4 | 153 | | 26 | 9 |
| 6 | About 300 | | | |
| 7 | | 32 | 52 | |
| 8 | | 50 | | |
| 10 | | | 82 | 61 |

EXAMPLE IV

In the above-described manner, the stability was determined of 5 gms. of pure ergocalcipherol (test a) and of 5 gms. of ergocalcipherol after washing at about 15° C. with a solution of 50 mgms. of hydroquinone in 10 ccs. of methanol (test b). The results are given in Table IV.

Table IV

| Time (in days) | Milli-equivalents of peroxide (per kg. of ergocalcipherol) | |
|---|---|---|
| | Test a | Test b |
| 0 | 6 | 2 |
| 5 | 65 | 3 |
| 11 | >200 | 10 |
| 15 | | 18 |
| 20 | | 30 |
| 25 | | 31 |
| 30 | | 31 |

Similar tests as described in the examples with respect to vitamin $D_2$ were made with vitamin $D_3$. The results agreed with the results given hereinbefore.

EXAMPLE V (A) 3 gms. of vitamin A acetate were dissolved by gently heating them in 6 mls. of ethanol. Then the solution was cooled to $-25°$ C. The liquid was drawn off and the crystals were washed with 6 mls. of ethanol and subsequently dried in a vacuum at 30° C.

(B) 3 gms. of vitamin A acetate were crystallized from a solution of 30 mgs. of hydroquinone in 6 mls. of ethanol in the manner described under A. The crystals were washed with a solution of 30 mgs. of hydroquinone in 6 mls. of ethanol and subsequently dried in a vacuum at 30° C.

(C) 3 gms. of vitamin A acetate were crystallized from a solution of 15 mgs. of 2,6-ditertiary-butyl-4-methyl phenol and 15 mgs. of 2,6-ditertiary-butyl-4-methoxy phenol in 6 mls. of ethanol in the manner described under A. The crystals were washed with 6 mls. of the same antioxidant solution and subsequently dried in a vacuum at 30° C.

The specific extinctions of these three preparations were measured at three wave lengths. The preparations were then stored in air in the dark at 20° C. and the peroxide content was determined at set times. The results are given in the subjoined Tables V and VI.

Table V

| | $E^{1\%}_{1cm.}$ | | |
|---|---|---|---|
| | 3110 A. | 3260 A. | 3370 A. |
| A | 1,280 | 1,517 | 1,294 |
| B | 1,280 | 1,522 | 1,292 |
| C | 1,284 | 1,503 | 1,287 |

Table VI

| | Proportion of peroxide in meq./g. $10^3$ after— | | | | |
|---|---|---|---|---|---|
| | 0 day | 1 day | 2 days | 3 days | 5 days |
| A | 7 | 88 | 183 | Running | Running |
| B | 1 | 3 | 3 | 7 | 563 |
| C | 2 | 3 | 3 | 6 | 294 |

What is claimed is:

1. A method of stabilizing crystalline compounds having carbon-carbon conjugated double bonds selected from the group consisting of vitamin A, vitamin $D_2$, vitamin $D_3$, provitamin $D_2$, provitamin $D_3$, esters of said vitamins and provitamins, tachysterol-2 and tachysterol-3, comprising the steps of applying to the surface of crystals of said compounds a solution of at least one solid antioxidant, in an amount sufficient only to coat the surface of said crystals with the antioxidant, and then drying said crystals thereby leaving the crystals coated only with the antioxidant.

2. The method of claim 1 in which the antioxidants are selected from the group consisting of butylated phenols, vitamin E, hydroquinone and mixtures thereof.

3. A method of stabilizing crystalline compounds having carbon-carbon conjugated double bonds selected from the group consisting of vitamin A, vitamin $D_2$, vitamin $D_3$, provitamin $D_2$, provitamin $D_3$, esters of said vitamins and provitamins, tachysterol-2 and tachysterol-3, comprising the steps of spraying the surface of the crystals of said compounds with a solution of 0.1% to 0.5% of at least one solid antioxidant, the amount of said solution being sufficient only to coat the surface of said crystals with the antioxidant, and then drying said crystals thereby leaving the crystals coated only with the antioxidant.

4. A method of stabilizing crystalline compounds having carbon-carbon conjugated double bonds, selected from the group consisting of vitamin A, vitamin $D_2$, vitamin $D_3$, provitamin $D_2$, provitamin $D_3$, esters of said vitamins and provitamins, tachysterol-2 and tachysterol-3, comprising the steps of dissolving said crystalline compounds in a solution of at least one solid antioxidant, in an amount sufficient only to coat the surface of said crystalline compounds with the antioxidant, crystallizing out said crystalline compounds, and then drying said crystalline compounds thereby leaving said compounds coated only with the antioxidant.

5. A method of stabilizing crystalline compounds having carbon-carbon conjugated double bonds selected from the group consisting of vitamin A, vitamin $D_2$, vitamin $D_3$, provitamin $D_2$, provitamin $D_3$, esters of said vitamins and provitamins, tachysterol-2 and tachysterol-3, comprising the steps of mixing crystals of said compounds with a solution of at least one solid anti-oxidant, in an amount sufficient only to coat the surface of said crystals with the antioxidant, and then spray drying said solution in a hot gas having a temperature between 80° C. and 240° C. thereby leaving the crystals coated only with the antioxidant.

References Cited in the file of this patent
UNITED STATES PATENTS

| | | |
|---|---|---|
| 1,879,762 | Nitardy | Sept. 27, 1932 |
| 2,432,698 | Taub et al. | Dec. 16, 1947 |
| 2,434,015 | Rosenberg et al. | Jan. 6, 1948 |
| 2,739,167 | Conn | Mar. 20, 1956 |
| 2,862,852 | Cannalonga | Dec. 2, 1958 |